United States Patent [19]

Mair et al.

[11] 4,057,464
[45] Nov. 8, 1977

[54] NUCLEAR REACTOR INSTALLATION

[75] Inventors: Georg Mair; Hans-Peter Schabert, both of Erlangen, Germany

[73] Assignee: Siemens Aktiengesellschaft, Munich, Germany

[21] Appl. No.: 501,761

[22] Filed: Aug. 29, 1974

[30] Foreign Application Priority Data

Sept. 17, 1973 Germany .............................. 2346726

[51] Int. Cl.² .............................................. G21C 9/00
[52] U.S. Cl. ......................................... 176/37; 176/38
[58] Field of Search ............................... 176/37, 38, 87

[56] References Cited

U.S. PATENT DOCUMENTS

| 3,667,370 | 6/1972 | Noble | 176/37 X |
| 3,829,551 | 8/1974 | Stein | 176/37 X |
| 3,929,568 | 12/1975 | Schabert | 176/38 |
| 3,937,651 | 2/1976 | Schabert | 176/38 |

FOREIGN PATENT DOCUMENTS

| 1,273,331 | 7/1968 | Germany | 176/37 |
| 868,672 | 5/1961 | United Kingdom | 176/38 |

OTHER PUBLICATIONS

"Power Reactor Containment"; Nucleonics, Oct. 1965, pp. 50–55.
Nuclear Applications & Technology, vol. 9, (Oct. 1970) No. 4, pp. 508–515.
Nuclear Abstracts, Aug. 15, 1971, p. 3431, Citation 34788.
"Confinement Systems Test Performed Dorning Deactivation of the 100 F Reactor", Proceeding 9th AEC Conf. Sept. 66, (vol. 1).

Primary Examiner—Stephen C. Bentley
Assistant Examiner—Ralph Palo
Attorney, Agent, or Firm—Kenyon & Kenyon, Reilly, Carr & Chapin

[57] ABSTRACT

In a nuclear reactor installation, the reactor building which is closed during the operation of the reactor, is subdivided into two ventilation-wise separate zones, wherein overpressure is maintained in the one zone by transporting filtered air from the first to the second zone. The invention is of interest particularly for pressurized water reactors.

10 Claims, 2 Drawing Figures

NUCLEAR REACTOR INSTALLATION

BACKGROUND OF THE INVENTION

The invention concerns a nuclear reactor installation with a reactor building which contains equipment and operating rooms and is closed during the operation of the reactor. Equipment rooms are called here those parts of the nuclear reactor installation which contain heavily radiating components and can therefore be entered only with special protective measures, e.g., protective clothing. Operating rooms, on the other hand, are such rooms, in which accessibility is assured operationally, i.e., also in the absence of special occurrences, as testing or maintenance work is to be performed there.

In connection with pressurized water reactors, reactor buildings are known which are partly accessible during the operation of the reactor. Here, a relatively expensive ventilation system takes care that sufficiently clean i.e., radiation-free, atmosphere is available in these accessible parts. The air is here drawn-in from the outside and pushed into the accessible rooms. From there, it flows through leaks, and optionally, through intentional passage openings, into the rooms in which a higher radiation level is permissible and underpressure relative to the accessible rooms is maintained. The air leaves the reactor building finally via filters and optionally, purification equipment with delay sections, decay tanks, etc. For this purpose, an exhaust gas chimney can be used, which serves to ensure sufficiently wide distribution and therefore, dilution of the gases.

Other pressurized water reactors, which are common particularly in the U.S.A, have a reactor building which is completely closed during the operation of the reactor. Here, one therefore gives up quite intentionally the accessibility during operation. The ventilating system can thereby be simplified, of course, as ventilation takes place only outside the operating time of the reactor, when the reactor building is to be opened.

SUMMARY OF THE INVENTION

It is an object of the invention to create a nuclear reactor installation, in which the discharge of radioactivity to the outside is reduced as far as possible, while at the same time the accessibility is improved over installations with a completely closed reactor building.

According to the invention, the reactor building is subdivided in a manner known per se into two ventilation-wise separate zones and in the one zone, which comprises at least parts of the operating space, overpressure is present relative to the second zone, which comprises the entire equipment space, by transporting filtered air from the second zone into the first zone.

In this new nuclear reactor installation, continuous supply of fresh air for the ventilation of accessible rooms is dispensed with. It is therefore also unnecessary to have an outlet continuously open in normal operation, through which air can escape that may be radioactively contaminated. The activity-free ventilation necessary for accessibility is instead obtained by internal circulation between the two zones. In the one zone, which is part of the operation space, as low a radioactivity level can be maintained by filtering as is required for the desired accessibility. For this purpose, a filter that adsorbs primarily iodine can be provided between the first and the second zone. Although not all the radiating components of the air can be captured thereby, filters for all components are substantially more expensive than those that are required for the relatively simple adsorption of iodine. On the other hand, iodine is the most dangerous radiating component, while the rare gases which are otherwise contained normally in air during the operation of the reactor, can usually be kept out by simple precautionary measures. For instance, $\beta$-radiation of rare gases, which is dangerous primarily for the conjunctive of the eye, can be screened out by means of goggles, which do not seriously limit the mobility and ability of workmen to work.

In another embodiment of the invention, a space is divided off in a gas-tight manner from the first zone, i.e., the ventilation-wise "clean" zone, and is connected ventilation-wise via a rare gas filter. In this space provision is thus made for complete purification of the air, which permits working entirely without protective devices. However, as the room is smaller than the first zone overall, considerably smaller rare gas filters are sufficient. Only a partial stream of about one-twentieth of the total quantity of the air circulated between the zones need pass through the rare gas filters. For better separation, the room can further be equipped with double doors.

A drying section can be placed in series with the filters for subdividing the interior of the reactor in accordance with the invention, whereby improved air conditioning can be obtained. A line, which can be shut off by means of a valve and connects the first and second zones, can furthermore be provided parallel to the filter. The valve may be openable, for instance, as a function of pressure. It is avoided thereby that in the case of accidents or special operating conditions, undesirably large pressures become effective between the individual zones, which stress the filters and possibly also the walls between the zones, excessively. One can further achieve by means of valves that, independently of the internal circulation provided by the invention, purging from the outside is possible. Such purging can take place, for instance, when the reactor is taken out of operation for refueling.

The subdivision according to the invention into two zones ventilated by internal circulation can be implemented in such a manner that spaces which are exposed to possible radiation danger because of leaks but are to belong, on the other hand, to the accessible first zone, such as rooms with leak-prone valves or measuring instruments that have to be read or serviced, are arranged in the flow path of the air through the first zone immediately ahead of the passage into the second zone. The air is thereby conducted intentionally in such a manner that the maximum radiation dose rate occurs practically shortly before the air leaves the accessible zone. According to the further invention, one can make access to rooms exposed to radiation danger due to leaks, more difficult, for instance, by special interlocks, air locks or the like.

In the case that the reactor building comprises a containment, particularly of steel, which contains the equipment and operating rooms and is enclosed by a protective structure or secondary shield made of concrete, so that a ring or annular space is created, the ring space may have exhaust air filters leading to the outside and contain all activity-carrying auxiliary systems which are not located in the containment. Here, the ring space is therefore not counted as one of the two zones which, according to the invention, are ventilation-wise placed in series.

BRIEF DESCRIPTION OF THE DRAWINGS

To explain the invention in further detail, an example of an embodiment will be described in the following, making reference to the attached drawing, where a cross section through the reactor building of a pressurized-water power reactor is shown, somewhat simplified, in FIG. 1.

The ventilation system used therein is shown in detail in a piping diagram in FIG. 2.

DETAILED DESCRIPTION OF THE INVENTION

Figure 1:
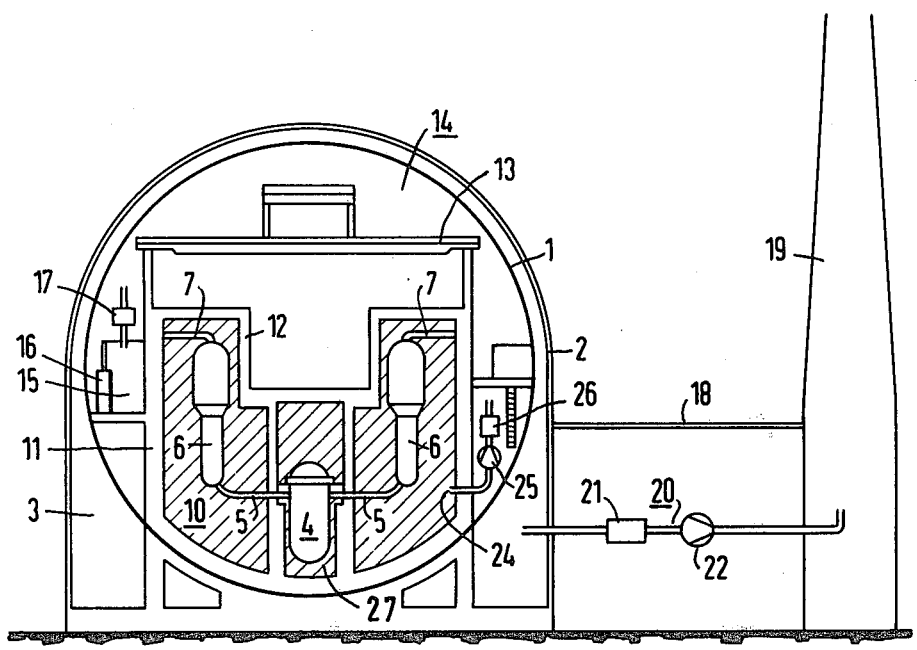

It can be seem in FIG. 1 that the reactor building comprises a spherical containment shell 1 consisting of steel and an outer secondary shield 2, enclosing the former by a cylindrical vertical wall and a hemispherical roof, which consists of concrete and, together with the sphere, encloses a ring or annular space 3. The reactor pressure vessel 4 is centrally arranged in the sphere. It feeds, via primary coolant lines 5, steam generators 6, from which the steam is conducted via pipelines 7 to a turbine (not shown).

The components of the primary cooling loop, of which main coolant pumps, pressurizers, etc. (not shown) are part in addition to the steam generators 6, are arranged in the so-called equipment space 10. The latter comprises the rooms indicated in the center of FIG. 1 by shading, which are surrounded by a fragment-protection cylinder or missile shield 11 and are closed off at the top by a demountable concrete cover 12. The fragment-protection cylinder has the purpose to intercept flying fragments in the event of a rupture of the primary loop components, so that they cannot damage the containment 1.

The remaining part in the interior of the continament 1 is the always accessible operating space 14. It includes, for instance, the space above the concrete cover 12 with a revolving crane 13 which is supported by the fragment-protection cylinder 11, as well as further equipment for the handling of fuel elements, the servicing of valves, etc. The operating space 14 is ventilation-wise separated from the equipment space. It is again subdivided itself. In the region of the equator of the containment 1 for instance, a chamber 15 is divided off, in which measuring and control equipment is located which is to be observed or serviced continuously or, at least, frequently. The chamber 15, which is accessible only via a double door 16, is ventilated within the operating space 14 via a rare gas filter 17.

Next to the secondary shield 2 there is an auxiliary installation building 18, which contains, for instance, shops, social rooms etc. The auxiliary-installation building 18 also contains an exhaust air line 20 leading to a chimney 19, by which air is drawn by a blower 22 from the ring space 3 via a filter 21. In this manner, underpressure can be maintained relative to the inside of the containment 1. At the same time, the activity-containing systems, such as cooling water tanks, (not shown) which are located protected in the ring space 2, are ventilated.

A suction line 24 leads from the equipment space 10 to a pump 25, by means of which air is drawn from the equipment space 10 and pushed into the operating space 14 via a filter 26. Thereby, a pressure gradient of, for instance, 1 mb from the operating space 14 toward the equipment space 10 is produced, which prevents with safety any uncontrolled emission of radio-activity from the equipment space into the operating space.

Figure 2:
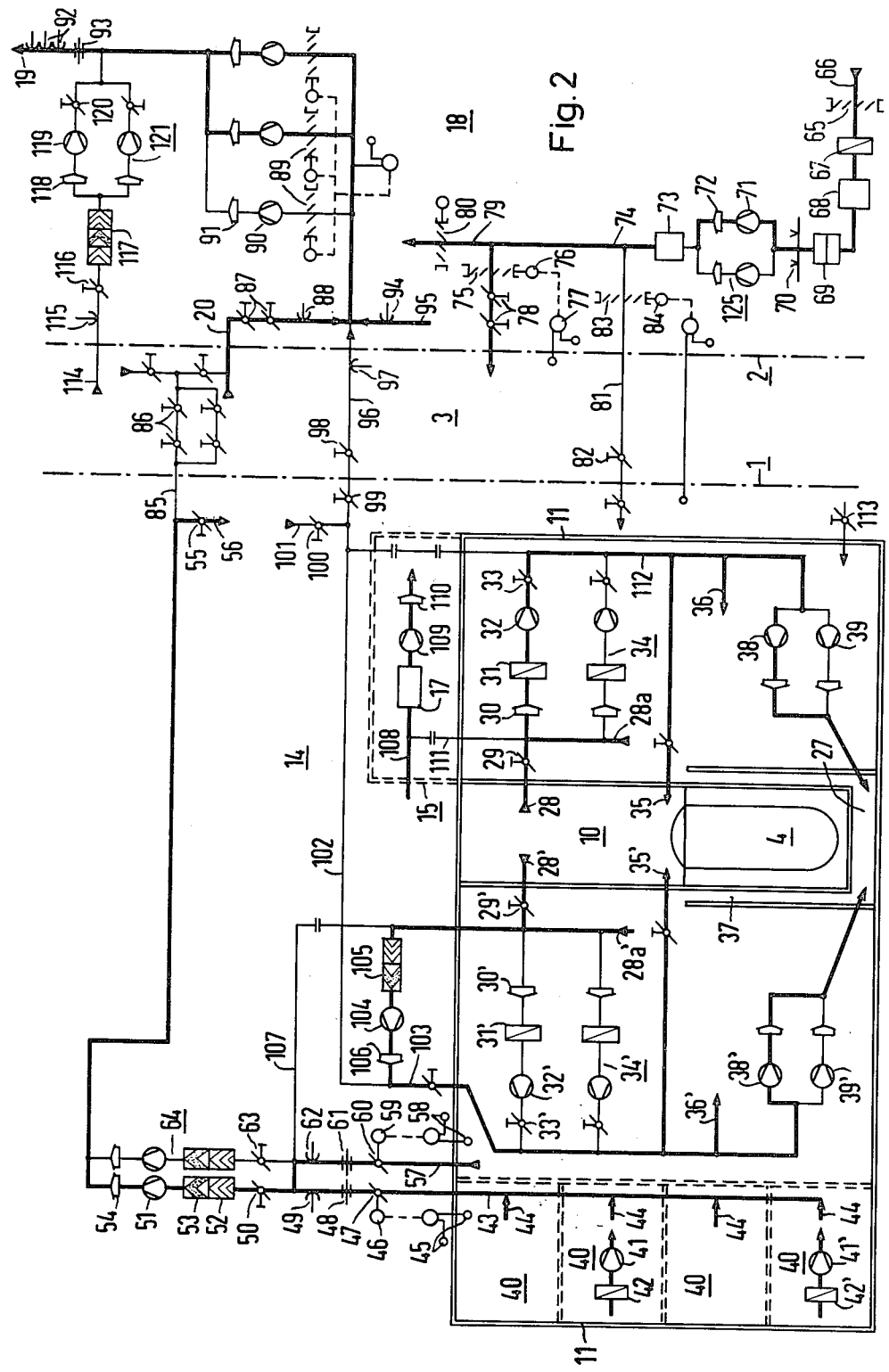

In FIG. 2, the ventilation of the reactor building is shown in detail. The lines used in normal operation are drawn heavier here than the devices normally not used. The containment 1 is furthermore indicated by a dash-dotted line, and likewise the secondary shield 2. The equipment space 10 is enclosed by the walls 11 and 12 of FIG. 1, in a radiation-proof and gas-tight manner. It contains, among other things, the reactor pressure vessel 4 in a reactor pit 27, which is closed off gas-tight by itself.

As will be seen, internal air circulation is provided at different points in the equipment space 10, primarily for cooling. Thus, the air is drawn-in from the area above the reactor pressure vessel 4 symmetrically via inlets 28, 28' and shut-off vanes 29, 29' as well as from the area of the steam generators via inlets 28a, 28a'. The air gets via a check valve 30, 30' to a cooler 31, 31', through which it is drawn by a blower 32, 32'. The entire arrangement can be shut off by a damper 33, 33' and is equipped for safety reasons with a spare set, which for simplicity is designated as a whole with 34, 34'. The cooled air is distributed in the equipment space 10 via lines 35, 35' and 36, 36'. Here, a ring space 37 surrounding the reactor pit 27 can be ventilated more heavily by a separate blower 38, 38', so that larger quantities of heat can be removed there in spite of large flow resistances. A standby unit 39, 39' is again associated with the blowers 38, 38'.

In two of four chambers 40 of the equipment space 10, which are shown in FIG. 2 as of equal size, two further blowers 41, 41' with coolers 42, 42' are provided in order to condition the air there in a suitable manner. The chambers 40 may contain, for instance, valves or emergency cooling equipment (not shown).

From the chambers 40, a suction line 43 with connections 44 in each of the chambers 40 leads, via a valve 47 which is controlled by a difference pressure measuring device 45 and can be set by a drive 46; a measuring orifice 48; a probe 49 for the measurement of the activity; and a setting valve 50; to a blower 51, which is preceded by a filter 52 for suspended particles as well as by an activated-carbon filter 53. The blower 51 therefore draws air from the chambers 40 of the equipment space 10, whose radioactivity is measured by the probe 49, via filters 52, 53 which retain at least iodine and aerosols, and pushes it via a check valve 54 and the line 56, which can be shut off by the damper 55, into the operating space 14. Thereby, a pressure difference of, for instance, 1 mb is maintained between the equipment room 10 and the operating room 14.

Parallel to the suction line 43 from the chambers 40, there is a further suction line 57, which leads into the area in the interior of the equipment space provided for the steam generators, and which is likewise connected with the blower 51. In an analogous manner it has a difference pressure measuring device 58, which controls a drive 59 for positioning the vane 60. In the suction line there is further provided an orifice 61, by which the flow rate can be measured, as well as a radiation probe 62.

As can be seen, a similar unit, which can be shut off by a damper 63 and is designated as a whole with 64, is connected parallel to the blower 51 as a standby.

In FIG. 2 is further shown that the ring space 3 between the containment 1 and the secondary shield 2 is vented from the outside. For this purpose, a suction line 66, which can be adjusted by a louvre vane 65, is provided, which draws via a cooler 67, a filter 68 and heaters 69 as well as air humidfiers 70. The associated blower 71 pushes the air into a line 74 via a check valve 72 and a filter 73. A similar unit 125 may be connected parallel to the blower 71 as a standby. From the pressure line 74 the air gets, via a further louvre vane 75 which can be set by a drive 76 according to the values of a pressure measuring device 77, into the ring space 3 via two series-connected dampers 78.

To the pressure line 74 is further connected a branch 79, which leads into the auxiliary equipment building via a louvre vane which can be set as a function of the pressure. A further line 81, which is not used in normal opeation, leads via two dampers 82 arranged on both sides of the containment 1, to the operating space 14. Its cross section can be adjusted by a louvre vane 83, whose drive 84 is set by the pressure difference between the interior of the containment 1 and the outside of the secondary shield 2. This line 81 can vent the interior of the containment 1 directly in special cases. The exhaust air can leave the containment 1 here via a connecting line 85. The connecting line 85, which contains various dampers 86, leads to the exhaust air line 20 of the ring space 3. In this line, which can be shut off outside the secondary shield by dampers 87, the radioactivity of the escaping air can be determined by a probe 88. If the activity is low enough, the air, which flows in via three louvre vanes 89 adjustable in dependence on the pressure, can be passed by means of three parallel-disposed fans 90 to the exhaust air chimney 19 via check valves 91. Three probes 92 are associated here with the discharge of the exhaust air line, which can be connected according the two-out-of-three system. The quantity of the exhaust air is determined by a measuring orifice 93.

An outlet 95 provided with a probe 94 from the auxiliary installation building 18 is associated with the exhaust air line 20. A further exhaust air line 96, which is provided with a probe 97, leads into the containment 1, at which dampers 98 and 99 are provided on both sides. In the interior, a damper 100 leads to a suction inlet 101, by means of which the operating space 14 can be exhausted.

A direct suction line for the equipment space 10 is connected via a line 102. It leads to an outside air line 103, by which part of the air of the equipment space 10 is transported by a blower 104 through two filters 105 in series and via a check valve 106. To the outside air line is further connected a connecting line 107 serving as a standby, which leads to the blower 51.

A further outside air line 108 in the operating space 14 serves for venting the chamber 15. Here, air is drawn-in by a blower 109 via rare gas filters 17 and is pushed into the chamber via a check valve 110. Therefore, the chamber 15 is always accessible without precautionary measures. It may, for instance, also be utilized as a room for the personnel.

The lines 111 and 112 are merely spare lines provided for emergencies. Up to then, they are shut off.

Direct connection between the equipment space 10 and the operating space 14 is possible via a damper 113. Thus, the equipment space, too, can be purged with fresh air via the operating space. The damper 113 can also be made operable in dependence on the pressure.

The ring space 3 is supplied with fresh air via the line 74, as described above. Should radioactivity occur in spite of this, a line 114 is provided as an exhaust, which is provided with a probe 115 and leads, via a damper 116 and three filters 117 connected in series as well as via a check valve 118, to a blower 119, which can be shut off by a damper 120. A further blower 121 is connected parallel as a standby.

The operating space 14 may also be smaller than shown in the example of the embodiment. It may, for instance, be confined to the area of the fuel pit, in order to allow refueling and/or to rooms with measuring equipment, measuring transformers or the like, which must be checked and serviced frequently.

In the operating space 14 can also be performed, analogously to the outside-air filtering which is carried out by means of the line 103, also filtering particularly for iodine and aerosols, by means of a blower (not shown) which draws from the operating space 14 and returns to the same.

What is claimed is:

1. A nuclear reactor installation comprising a reactor building forming a containment which is closed during reactor operation and internally defines an equipment zone containing radiating components and an operating zone which is accessible to workmen, and having a system for providing an atmospheric overpressure in the operating zone relative to the atmospheric pressure in the equipment zone; wherein the improvement comprises said system having means for removing a flow of atmosphere from said equipment zone, filter means for filtering said flow, and means for introducing a flow of the atmosphere filtered by said filter means to said operating zone under said overpressure.

2. The installation of claim 1 in which said filter means removes iodine from the flow of atmosphere removed from the equipment room.

3. The installation of claim 2 in which said building forms a room enclosed from said operating room and has means for removing a flow of atmosphere from the operating room and means for filtering the removed flow of atmosphere to remove rare gases therefrom, and means for introducing a flow of this removed and filtered atmosphere to said room.

4. The installation of claim 3 in which said means for removing atmosphere from the operating zone, removes a flow of about one-twentieth of the atmospheric flow introduced to said equipment room.

5. The installation of claim 4 in which a double-door connects said room with said operating zone.

6. The installation of claim 2 in which said system has means for drying the flow of atmosphere removed from said equipment room prior to its introduction to said operating zone.

7. The installation of claim 1 having controllable means for directly interconnecting said zones for atmospheric flow therebetween.

8. The installation of claim 1 in which said building forms at least one radiation dangerous room and said operating zone is connected to feed its overpressure atmosphere back to said equipment zone via said dangerous room.

9. The installation of claim 1 in which said reactor building is closed by a spherical steel containment shell and a secondary concrete shield having a cylindrical wall forming a closed annular space for containing auxiliary equipment around the containment shell, and has exhaust means for exhausting the atmosphere from said annular space to the atmosphere outside of the building, said exhaust means including filter means for filtering the exhausting atmosphere from said annular space.

10. The installation of claim 1 in which said building has means for purging all of its enclosed spaces with fresh atmosphere from outside of the building.

* * * * *